(12) United States Patent
Ayotte et al.

(10) Patent No.: US 7,690,821 B2
(45) Date of Patent: Apr. 6, 2010

(54) SAFETY DEVICE FOR A LOAD CARRYING VEHICLE

(76) Inventors: Richard Edward Ayotte, 3515 Blais Road, Ottawa, Ontario (CA) K1G 3N4; Robert Dennis Hewson Cassidy, 63 Foley Road, Gatineau, Quebec (CA) J9H 2E6

(*) Notice: Subject to any disclaimer, the term of this patent is extended or adjusted under 35 U.S.C. 154(b) by 0 days.

(21) Appl. No.: 11/705,562

(22) Filed: Feb. 12, 2007

(65) Prior Publication Data

US 2007/0200045 A1 Aug. 30, 2007

(30) Foreign Application Priority Data

Feb. 13, 2006 (CA) .................................. 2536183

(51) Int. Cl.
*F21V 21/00* (2006.01)

(52) U.S. Cl. ....................... 362/396; 248/505

(58) Field of Classification Search ................ 248/505, 248/499, 316.5, 229.13, 229.23, 231.51; 410/77, 80; 116/173, 28 R; 362/396, 398, 362/368, 485, 540, 542; 403/408.1
See application file for complete search history.

(56) References Cited

U.S. PATENT DOCUMENTS

| | | | | |
|---|---|---|---|---|
| 2,166,520 A | * | 7/1939 | Challoner | 116/30 |
| 2,569,068 A | * | 9/1951 | Maxwell | 362/344 |
| 3,041,580 A | * | 6/1962 | Bos | 340/473 |
| 3,080,581 A | * | 3/1963 | Smihal | 114/343 |
| 3,992,618 A | * | 11/1976 | Matthews et al. | 362/396 |
| 4,633,215 A | * | 12/1986 | Anders et al. | 340/473 |
| 5,209,562 A | * | 5/1993 | Glassford | 362/378 |
| 5,448,459 A | * | 9/1995 | Rogers | 362/191 |
| 5,481,244 A | * | 1/1996 | Dicke | 340/473 |
| 5,769,526 A | * | 6/1998 | Shaffer | 362/459 |
| 6,619,813 B1 | * | 9/2003 | Schnell | 362/116 |
| 6,874,920 B2 | * | 4/2005 | Huffman et al. | 362/477 |
| 7,111,965 B2 | * | 9/2006 | Hsu | 362/396 |
| 7,308,864 B1 | * | 12/2007 | Catner | 116/173 |
| 2003/0227773 A1 | * | 12/2003 | Yang | 362/199 |
| 2004/0156205 A1 | * | 8/2004 | Pisciotti | 362/485 |
| 2006/0126349 A1 | * | 6/2006 | Parker et al. | 362/396 |
| 2007/0115672 A1 | * | 5/2007 | Nelson et al. | 362/396 |

FOREIGN PATENT DOCUMENTS

DE 4011799 A1 * 10/1990

* cited by examiner

*Primary Examiner*—Ramon O Ramirez
(74) *Attorney, Agent, or Firm*—James Creighton Wray; Meera P. Narasimhan

(57) ABSTRACT

A safety device for use with a load-carrying vehicle, which includes a lamp and a flag to warn vehicles of overhanging or extended loads. The device has a supporting member for attaching to a load. The supporting member may attach to the load using screws, bungee cords, or magnetism, or by receiving the end of a pipe or tubing in an internal indentation. The supporting member is formed as a clamp with two elongate parts hingedly connected in a base unit with a spring mechanism.

17 Claims, 2 Drawing Sheets

SAFETY DEVICE FOR A LOAD CARRYING VEHICLE

This application claims the benefit of Canadian Application No. 2,536,183 filed Feb. 13, 2006, which is hereby incorporated by reference in its entirety.

FIELD OF THE INVENTION

This invention relates to a safety device for a load carrying vehicle.

BACKGROUND OF THE INVENTION

The laws of most (if not all), provinces and states require that if a vehicle is carrying a load which overhangs beyond the rear, front or sides of the vehicle, then a safety device has to be attached to the protruding end of the load. This is usually a flag and/or a lamp. For lack of anything 'purpose made', people transporting lumber, piping and other such materials that overhang the vehicle, typically fasten a red 'rag' or strip of red plastic to the material in a makeshift fashion.

The problem with the make-shift strip of red cloth or plastic tape is that in the majority of cases, the state and provincial legislation requires an open flag at the end of the load (the flag size required tends to vary between 12 to 18 inches square, depending on the state or province) and, during twilight and evening, a red or amber light visible from the rear and sides of the load.

This presents a problem for anyone transporting overhanging loads, and most makeshift solutions, either taped or tacked to the load, do not meet the legislated requirements, not to mention the risk of potential accident or injury as a result of a poorly marked overhanging load.

SUMMARY OF THE INVENTION

It is an object of the present invention to provide an improved safety device for a load-carrying vehicle which is convenient to use and is capable of providing warning of a protruding load to a cyclist, pedestrian, or driver of a following vehicle.

According to the present invention, there is provided a safety device for use with a load-carrying vehicle comprising; a supporting member having means for attaching to a load, said supporting member having a lamp casing fastened thereon, and a flag-supporting arrangement for the mounting of a flag. The flag may be brightly coloured.

The term "flag" as used herein, is to be understood as applying to a piece of cloth or other material, brightly coloured, for use as a warning device.

BRIEF DESCRIPTION OF THE DRAWINGS

An embodiment of the invention will now be described, by way of example, with references to the accompany drawings in which.

The same reference numerals are applied in the figures to like parts.

DETAILED DESCRIPTION OF THE INVENTION

Figure 1:
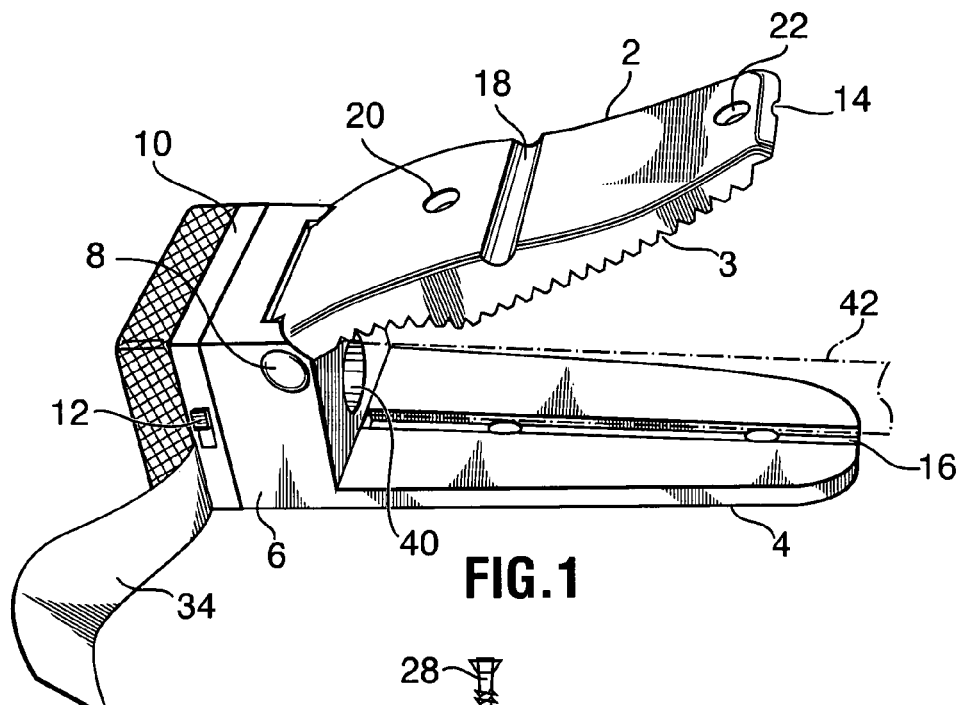
FIG. 1 is a perspective view of the safety device.

Referring to FIG. 1 the safety device comprises a supporting member comprising two elongate parts 2 and 4 hingedly connected in a base unit 6 with a spring mechanism 8. An LED flashing unit 10 with a reflector lens is provided on the base unit 6 whilst a switch 12 is provided for control of the flashing unit 10.

The upper elongate part 2 is formed with a serrated inner lower surface 3 to facilitate the gripping of a load.

Longitudinal grooves 14 and 16 are formed respectively in the elongate parts 2 and 4. A transverse groove 18 is provided in the upper surface of elongate part 2 to facilitate the use of bungee cords (not shown) or other means to fasten the safety device onto a load etc.

A pair of apertures 20 and 22 is drilled through the upper elongate part 2 with corresponding apertures 24 and 26 in the lower elongate part 4. Two screws 28 and 29 are shown in FIG. 2 and, in use, these are passed through the holes or apertures 20 and 22 and screwed onto the load 42 (FIG. 2) to fasten the safety device onto the load 42 in addition to, or instead of, a bungee cord.

Figure 2:
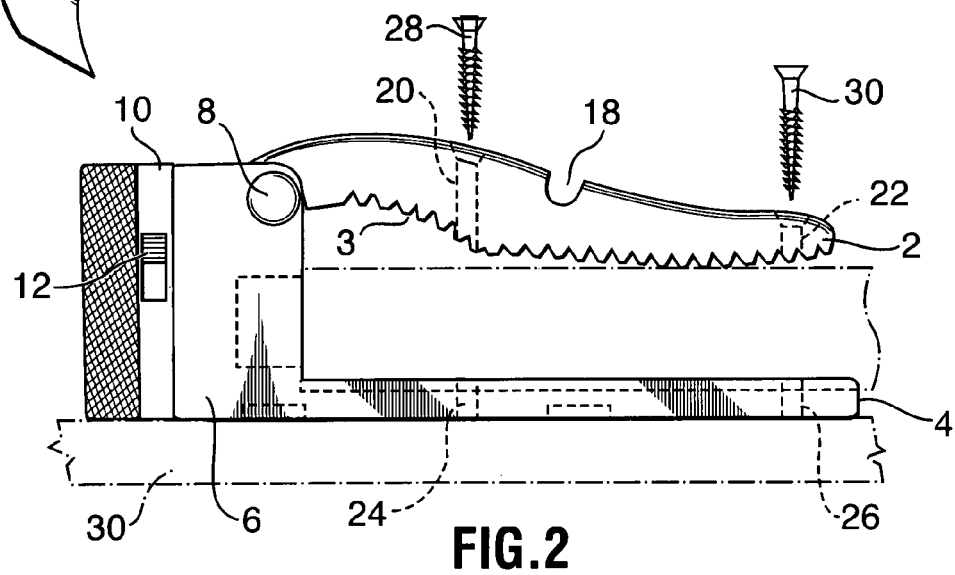
FIG. 2 is a side view of the safety device of FIG. 1.
Figure 3:
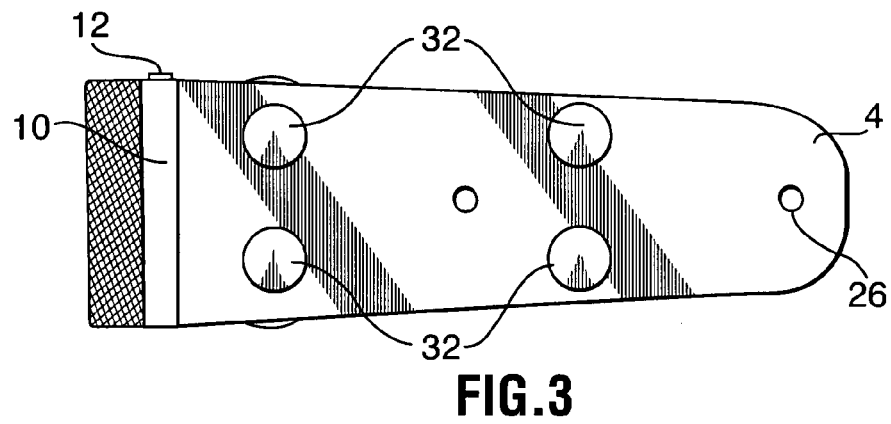
FIG. 3 is a bottom view of the safety device of FIGS. 1 and 2.

FIG. 2 also shows a piece of the load 42 under the clamp. The holes in the clamp (apertures 20, 24, and 22, 26) are aligned such that a screw can pass through 20, 24 and 22, 26 when the clamp is fully closed (i.e. there is no piece of wood within the jaws). Thus, the user can screw the clamp down onto a load 42.

When the load 30 is metallic, magnetic members 32 may be provided to hold the safety device on the load and/or the vehicle.

Referring to FIG. 1 it will be seen that a flag 34, or similar warning device, is fastened to, or hung from, the safety device in those jurisdictions where this is required. It is often stated that this should be a red flag. Three indents such as 36 and 38 (FIGS. 4 and 5) are provided on opposite sides of the base unit 6 to facilitate the use of square rods (not shown) for hanging flag 34 downwards from base unit 6. Screws (not shown) can be used to fasten the rods in place.

Figure 4:
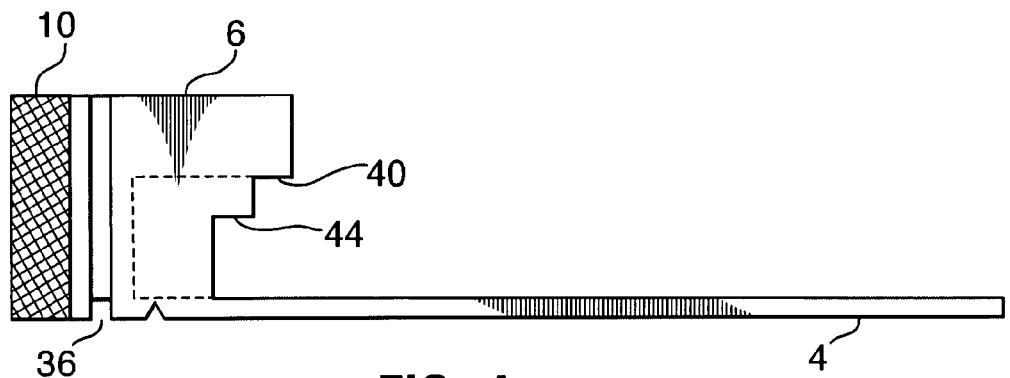
FIG. 4 is a side view of the safety device in silhouette format.
Figure 5:
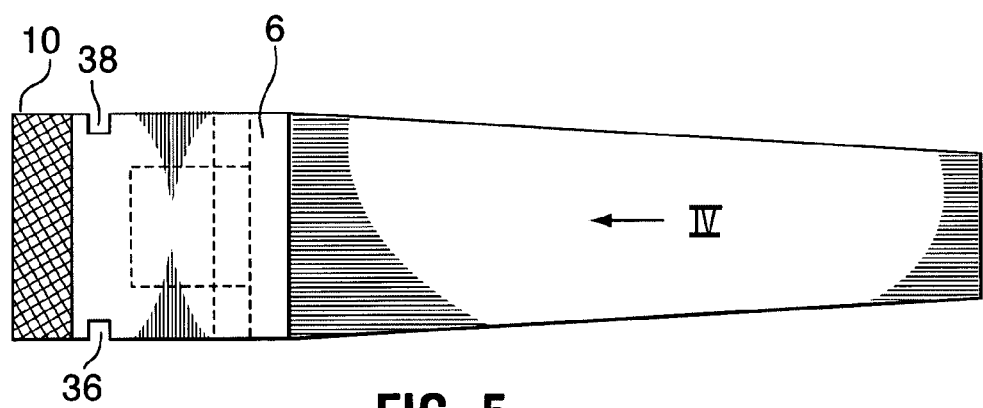
FIG. 5 is a plan view in silhouette format.
Figure 6:
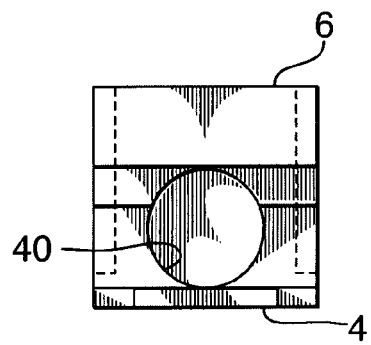
FIG. 6 is a front view of the safety device in silhouette format in the direction IV in FIG. 5.

In FIG. 1 a blunt-ended depression 40 of circular cross-section is provided in the base unit 6 for receiving the end of a load 42, which may be tubing. For receiving loads of different diameter or thickness, internal indentations are shown in FIGS. 2 and 4. The depression 40 is identified in FIG. 4 and another depression 44 of small diameter is also identified in FIG. 4. Thus loads of different diameter or size can be accommodated by the base unit 6.

It will be seen that the embodiment incorporates a brightly coloured safety flag and an LED flashing signal integrated into a clamp for attaching to overhanging loads during transport. The clamp can be attached to the load material in several manners.

The clamp provides notches for three-quarter-inch material, and for one-inch material, as well as a one-inch diameter notch for tubing or pipe. In addition to fastening the clamp using the pressure exerted by the jaws, it can optionally be fastened to material using the screw holes in the clamp, or by using the notches in the clamp to secure it to material with a bungee-cord. In addition, the clamp can be attached to metal material by using magnets in the base of the clamp.

The clamp advantageously includes an 18×18 inch flag of bright red material, which can be attached to the bottom rear of the clamp, or to either side of the clamp. The back of the clamp houses a red LED light that is visible from the sides as well as the rear. The battery-powered LED light has switch that cycles through on-flashing-off. In some cases, a steady light can be used.

There is an unfulfilled need in the market for a versatile, easily attachable (and removable) reusable clamp that meets virtually all of the highway safety codes by incorporating both an open red flag and a flashing red light. The flag and light may, of course, be amber if required.

It will be seen that the embodiment incorporates a brightly coloured safety flag and an LED flashing signal integrated into a clamp for attaching to overhanging loads during transport. The clamp can be attached to the load material in several manners.

In another modification spring mechanism 8 could include a corresponding arm at approximately 45° to enable to user to better open the elongate parts 2 and 4. In a further modification a pair of pivoting arms, extendable to 90°, could be positioned under the elongate parts 2 and 4 and able to hold the flag in position.

While the invention has been described with reference to specific embodiments, modifications and variations of the invention may be constructed without departing from the scope of the invention, which is defined in the following claims.

The embodiments of the invention in which an exclusive property or privilege is claimed are defined as follows:

1. A safety device for use with a load carrying vehicle comprising
   (a) a supporting member having means for attaching to a load,
   (b) said supporting member having a lamp casing fastened thereon, and
   (c) a flag supporting arrangement for the mounting of a flag
   wherein the supporting member further comprises different shaped indentations for receiving and holding differently shaped loads in the attachment device.

2. A safety device according to claim 1 wherein said supporting member comprises a pair of elongate parts to hold the load therebetween.

3. A safety device according to claim 2 wherein said elongate parts are hinged together at one end.

4. A safety device according to claim 2 wherein one of said elongate parts has an inner serrated surface.

5. A safety device according to claim 1 wherein a plurality of magnetic members are provided on the underside of said supporting member to facilitate holding of the safety device on said vehicle and/or said load.

6. A safety device according to claim 1 wherein said lamp casing is on the rear of the supporting member and incorporates a switch.

7. A safety device according to claim 1, wherein the shaped indentations are angled indentations for attaching to lumber of varying thicknesses.

8. A safety device according to claim 1, wherein the shaped indentations are one or more circular indentations for receiving and attaching to cylindrical pipe or tubing.

9. A safety device for use with a load carrying vehicle comprising
   (a) a supporting member having means for attaching to a load,
   (b) said supporting member having a lamp casing fastened thereon, and
   (c) a flag supporting arrangement for the mounting of a flag,
   wherein apertures are formed in said supporting member to facilitate screw attachment to the vehicle and/or said load and wherein the supporting member further comprises different shaped indentations for receiving and holding different shaped loads in the attachment device.

10. A safety device for use with a load carrying vehicle comprising
    (a) a supporting member having means for attaching to a load,
    (b) said supporting member having a lamp casing fastened thereon, and
    (c) a flag supporting arrangement for the mounting of a flag,
    wherein said supporting member comprises a pair of elongate parts to hold the load therebetween, wherein said elongate parts are hinged together at one end,
    wherein said elongate parts are hinged together in a base unit and said base unit includes internal indentation to facilitate the receiving of loads of different thickness.

11. A safety device for use with a load carrying vehicle comprising
    (a) a supporting member having means for attaching to a load,
    (b) said supporting member having a lamp casing fastened thereon, and
    (c) a flag supporting arrangement for the mounting of a flag,
    wherein the supporting member further comprises a groove for receiving a bungee cord or other means for attachment and wherein the supporting member further comprises different shaped indentations for receiving and holding different shaped loads in the attachment device.

12. A safety apparatus for attaching to a load comprising a body having a first side, a second side opposite to the first side, an illumination device on the first side, an attachment device on the second side, and a support device, further comprising a shaped indentation on the second side for receiving and holding differently shaped loads in the attachment device and wherein the attachment device comprises first and second opposing elongate members for receiving and holding the load therebetween.

13. The apparatus of claim 12, further comprising a hinge connection for hingedly connecting the first and second opposing elongate members to the second side.

14. The apparatus of claim 12, further comprising an inner serrated surface along at least one of the first and second opposing elongate members.

15. The apparatus of claim 12, wherein the illumination device comprises a warning lamp visibly disposed away from the attachment device when attached to the load, and a switch for controlling the lamp.

16. The apparatus of claim 12, wherein the support device comprises a flag mounting member for receiving and holding a flag thereon.

17. The apparatus of claim 12, further comprising attachment means on the attachment device for attaching the safety apparatus to the load.

* * * * *